US007615881B2

(12) United States Patent
Halsey et al.

(10) Patent No.: US 7,615,881 B2
(45) Date of Patent: Nov. 10, 2009

(54) POWER TURBINE SPEED CONTROL USING ELECTRICAL LOAD FOLLOWING

(75) Inventors: David G. Halsey, Rockford, IL (US); Charles J. Romenesko, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 525 days.

(21) Appl. No.: 11/642,401

(22) Filed: Dec. 20, 2006

(65) Prior Publication Data

US 2008/0148726 A1 Jun. 26, 2008

(51) Int. Cl.
*H02P 9/04* (2006.01)
*F02C 6/00* (2006.01)

(52) U.S. Cl. .......................... 290/52; 290/4 R; 60/773; 60/39

(58) Field of Classification Search ..................... 290/2, 290/4 R, 40 C, 40 F, 52; 60/39, 182, 773
See application file for complete search history.

(56) References Cited

U.S. PATENT DOCUMENTS 5,635,768 A * 6/1997 Birch et al. ............... 290/40 C
5,966,925 A * 10/1999 Torikai et al. ................. 60/778
6,169,334 B1 * 1/2001 Edelman ...................... 290/52
6,175,210 B1 * 1/2001 Schwartz et al. ............ 318/801
6,825,575 B1 * 11/2004 Edelson .................... 290/40 C
6,979,914 B2 * 12/2005 McKelvey et al. ........ 290/40 C
7,045,913 B2 * 5/2006 Ebrahim et al. ............... 290/52
7,078,825 B2 * 7/2006 Ebrahim et al. ............... 290/52
7,274,111 B2 * 9/2007 Andrew et al. ................ 290/52

* cited by examiner

*Primary Examiner*—Nicholas Ponomarenko
(74) *Attorney, Agent, or Firm*—Stephen G. Mican

(57) ABSTRACT

A power turbine speed control system for a turbo-shaft type gas turbine engine that has a gas generator compressor spool and a power turbine spool and drives an electrical generator that powers at least one electrical load by way of at least one electrical bus, comprises a power turbine controller that senses the rotary speed of the power turbine spool and generates at least one signal that changes the torque of the electrical generator in response to the sensed change in the rotary speed of the power turbine spool.

5 Claims, 4 Drawing Sheets

56
46 42 36 38 44 40 26 34 28 50 60 6 14 8 18 32 12 10 16 20 58 54 22 50 4

56
38
40
50
50
42
34
32
54
58
60
36
26
22
20
46
28
18
8
16
44
14
10
12
6
4

POWER TURBINE SPEED CONTROL USING ELECTRICAL LOAD FOLLOWING

FIELD OF THE INVENTION

The invention relates to a speed control for a turbo-shaft type gas turbine engine that drives an electrical power generation system, and more particularly to a speed control for a gas turbine engine driven electrical power generation system that maintains a substantially constant engine speed despite changes in electrical loading.

BACKGROUND OF THE INVENTION

As aeronautical gas turbine engines of the free turbine turbo-shaft type find expanding applications for power generation applications due to their high achievable power densities, it is becoming increasing important to obtain the maximum transient response capability from the engines. In particular, many of these power generation applications are striving to obtain the most efficient and power dense power generation possible. This efficiency may rely on superconducting generators that have much longer excitation system time constants than the gas turbine engine. Although the two to four second time constant of the aircraft gas turbine engine will never satisfy the near instantaneous load-on and load-off transient capability of electrical systems, obtaining the maximum transient capability from the engine will greatly reduce the transient handling requirements for any associated energy storage and management systems, such as capacitors, batteries, flywheels and so forth. Furthermore, even if a conventional synchronous generator that can obtain very fast load-on and load-off power transients provides power generation, it may not be desirable to utilise this capability because of the transient response limitations of the engine. Ideally, the electrical load should follow the transient response of the gas turbine to maintain power turbine speed control.

SUMMARY OF THE INVENTION

The invention comprises a power turbine spool speed control system for a free turbine turbo-shaft type gas turbine engine that adjusts the load of an electrical power generation system that it drives to follow the power generation capacity of its power turbine spool and thereby maintain constant power turbine spool speed.

The invention generally comprises a power turbine speed control system for a turbo-shaft type gas turbine engine that has a gas generator compressor spool and a power turbine spool and drives an electrical generator that powers at least one electrical load by way of at least one electrical bus, comprises a power turbine controller that senses the rotary speed of the power turbine spool and generates at least one signal that changes the torque of the electrical generator in response to the sensed change in the rotary speed of the power turbine spool.

DETAILED DESCRIPTION OF THE INVENTION

Figure 1:
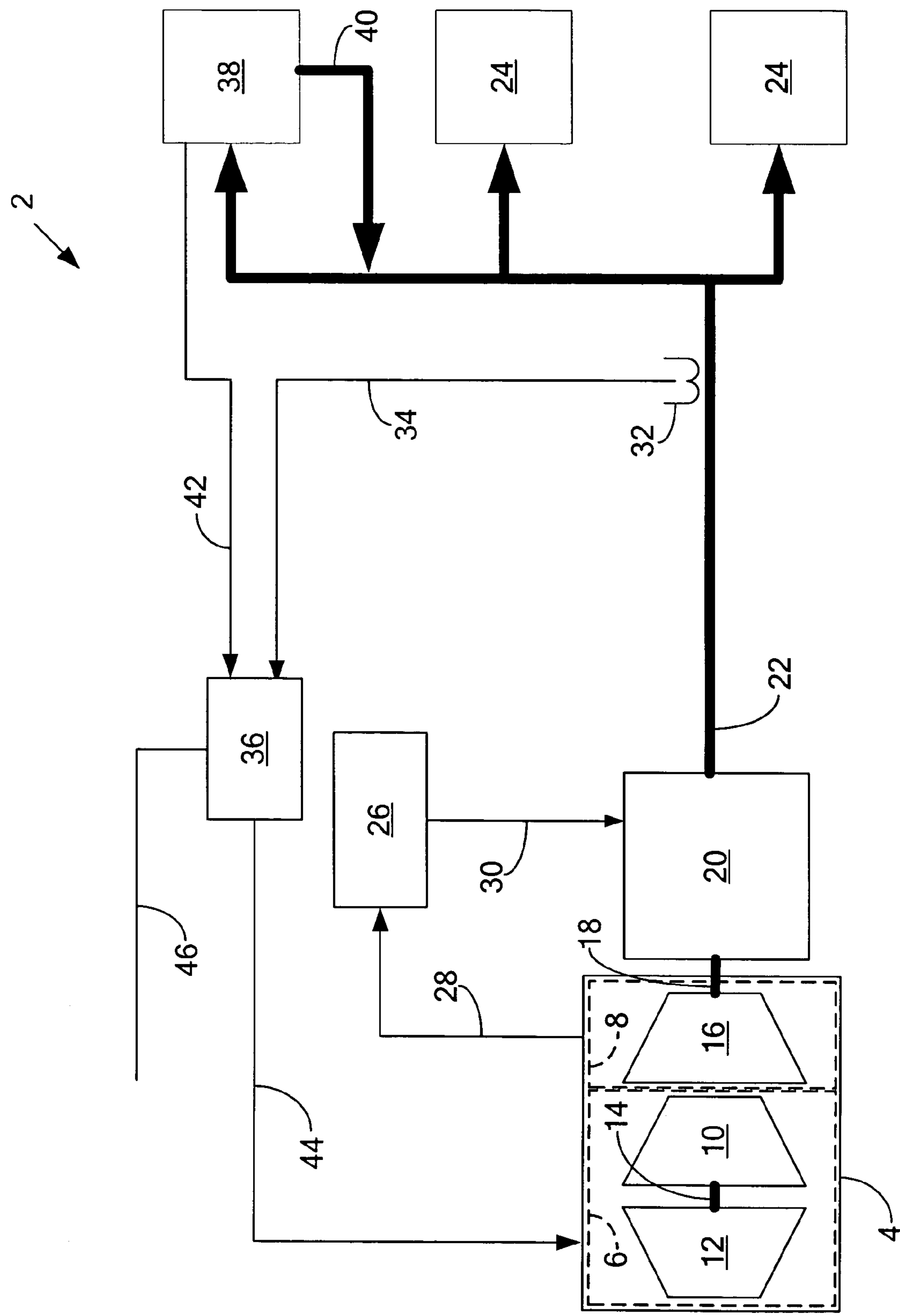
FIG. 1 is a schematic diagram of a power turbine spool speed control system a turboshaft type gas turbine engine according to a first possible embodiment of the invention.

FIG. 1 is a schematic diagram of a power turbine speed control system 2 for a turboshaft type gas turbine engine 4.according to a first possible embodiment of the invention. The gas turbine engine 4 comprises a gas generator compressor spool 6 and a power turbine spool 8. The gas generator compressor spool 6 comprises a gas generator turbine 10 that drives a gas generator compressor 12 by way of a gas generator shaft 14. The power turbine spool 8 comprises a power turbine 16 that drives a power turbine shaft 18.

The gas turbine engine 4 drives an electrical generator 20 by way of the power turbine shaft 18. Although the gas generator spool 6 generates combustion gas that imparts torque to the power turbine spool 8, the rotational speed of the power turbine spool 8, and thus rotational speed of the power turbine shaft 18 and the electrical generator 20, is mechanically independent of the rotational speed of the gas generator spool 6.

The electrical generator 20 is generally a polyphase alternating current (AC) generator, typically of the three-phase type, that generates power on an AC bus 22. The AC power on the AC bus 22 may drive AC electrical loads directly, may drive direct current (DC) loads through appropriate rectification, or both. When AC loads alone are present, such as represented by AC loads 24, the AC loads 24 receive the generated power directly from the AC bus 22. When DC loads are present, a rectifier system 24 receives AC electrical power from the AC bus lines 22 and converts it to direct current (DC). The rectifier system 24 may be of the passive or active rectifier type.

The gas turbine engine 4 develops a power turbine spool rotary speed signal. A power turbine speed controller 26 receives the power turbine spool rotary speed signal from the gas turbine engine 4 by way of a power turbine rotary speed signal line 28. The power turbine controller 26 senses the rotary speed of the power turbine spool 8 from the level of the power turbine spool rotary speed signal. The power turbine controller 26 produces an excitation signal for the generator 20 on an excitation signal line 30 that changes in response to speed variations of the power turbine shaft 18. These variations may result from any change in input torque supplied by the gas generator compressor spool 6 or load torque exerted by the generator 20 due to increased power draw on the AC bus 22.

For instance, if the power turbine controller 26 senses a drop in rotary speed of the power turbine spool 8 under a predetermined operating speed, the power turbine controller 26 reduces the level of the excitation signal that the generator 20 receives on the excitation line 30 so that it reduces its output and therefore the torque that it exerts on the power turbine spool 8, thereby letting the rotary speed of the power turbine spool 8 return to its predetermined operating speed. If the power turbine controller 26 senses an increase in rotary speed of the power turbine spool 8 over the predetermined operating speed, the power turbine controller 26 increases the level of the excitation signal that the generator 20 receives on the excitation line 30 so that it increases its output and therefore the torque that it exerts on the power turbine spool 8, thereby letting the rotary speed of the power turbine spool 8 return to its predetermined operating speed.

The power turbine speed control system 2 may also comprise a load power sensor 32 that senses the power consumed by the AC loads 24. The load power sensor 32 generates a load power signal representative of the power consumed by the AC loads 24 on a load power signal line 34. The power turbine speed control system 2 may further comprises a fuel system controller 36 that receives the load power signal on the load power signal line 34.

The power turbine speed control system 2 may still further comprise an energy management system 38, such as a flywheel, battery or capacitor back fed by a bi-directional inverter/rectifier, that stores energy that it may feed back into the AC bus 22 by way of storage supply line 40. The energy management system 38 generates an energy storage level feedback signal on a storage signal line 42. The fuel system controller may receive the storage signal on the storage signal line 42 and compare it to the load power signal on the load power signal line 34 to generate a fuel flow command signal on a fuel command line 44. The gas turbine engine 4 receives the fuel flow command signal on the fuel command line 44 and adjusts its fuel flow accordingly to compensate for any increase or decrease in the consumption of power on the AC bus 22 by the AC loads 24 as well as the level of stored energy in the energy management system 38. If transient changes in power by the loads 24 are predictable, the fuel system controller 36 may respond to a feed forward fuel command on a feed forward signal line 46 and adjust the fuel flow command signal on the fuel command line 44 accordingly.

Figure 2:
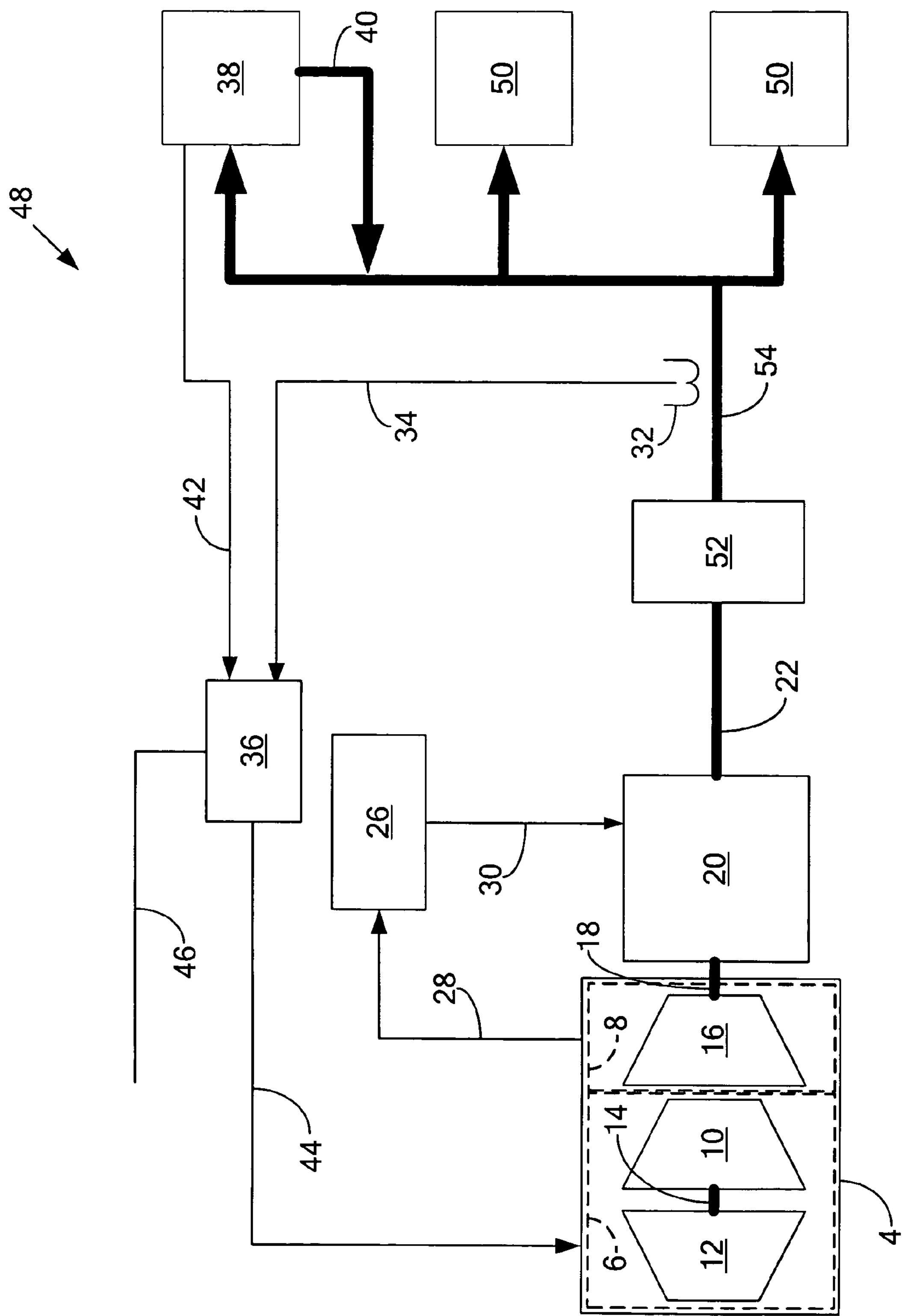
FIG. 2 is a schematic diagram of a power turbine speed control system for a turboshaft type gas turbine engine according to a second possible embodiment of the invention.

As hereinbefore stated, the AC power on the AC bus 22 may drive AC electrical loads directly, may drive DC loads through appropriate rectification, or both. FIG. 2 is a schematic diagram of a power turbine speed control system 48 for a turboshaft type gas turbine engine 4.according to a second possible embodiment of the invention that is useful when DC loads are present, such as represented by DC loads 50. A passive rectifier system 52 receives AC electrical power from the AC bus 22 and converts it to DC power on a DC bus 54. In this case, the energy management system 38 may comprise various DC energy management solutions, such as a capacitor bank, a battery or a bidirectional inverter/rectifier fed flywheel. The energy that it stores energy may in this case feed back into the DC bus 54 by way of the storage supply line 40. This embodiment otherwise operates in the same manner as the power turbine speed control system 2 hereinbefore described in connection with FIG. 1.

Figure 3:
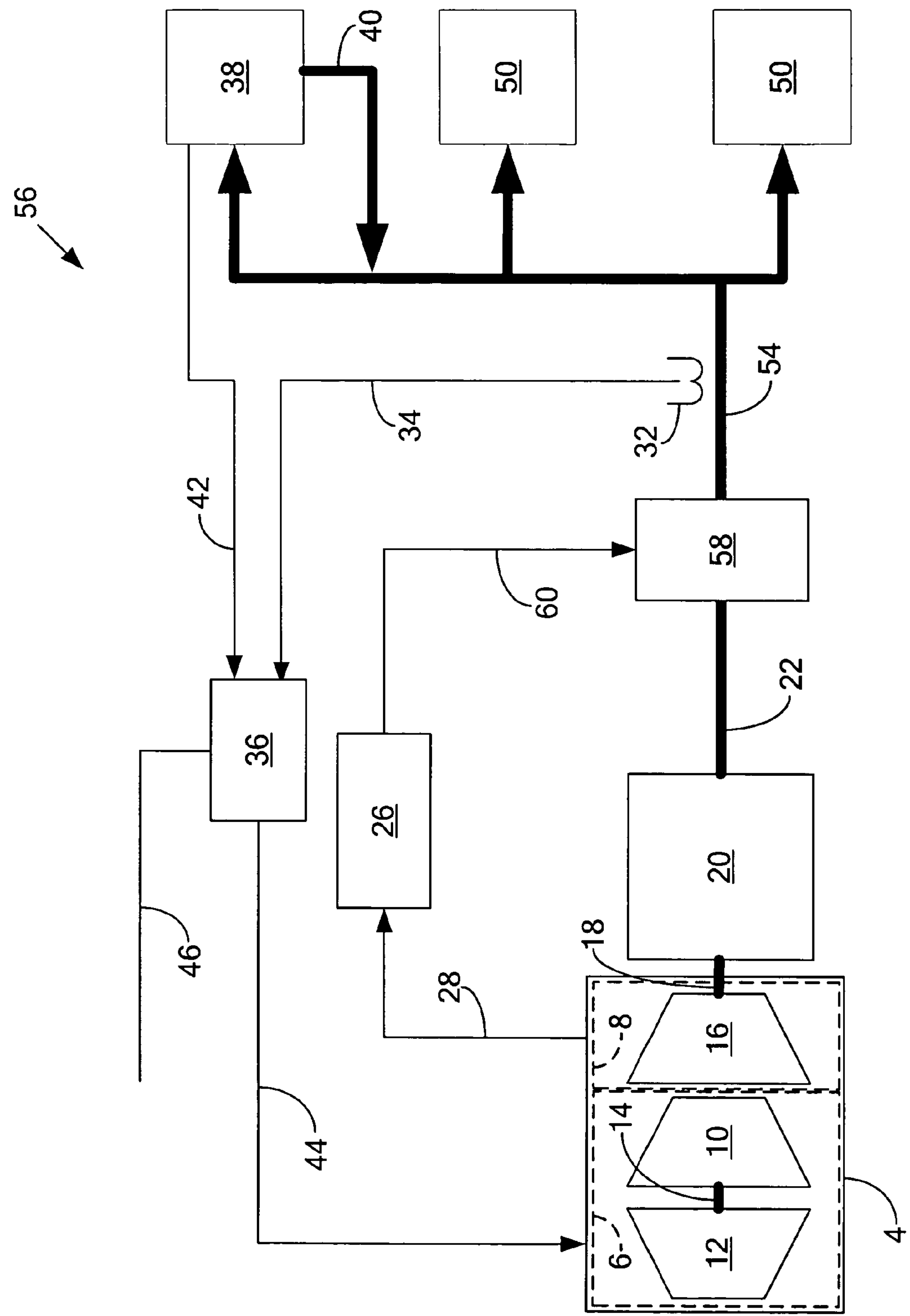
FIG. 3 is a schematic diagram of a power turbine speed control system for a turboshaft type gas turbine engine according to a third possible embodiment of the invention.

FIG. 3 is a schematic diagram of a power turbine speed control system 56 for a turboshaft type gas turbine engine 4 according to a third possible embodiment of the invention that is also useful when DC loads are present, such as represented by the DC loads 50. It uses an active rectifier system 58 instead of the passive rectifier system 52 that comprises the power turbine speed control system 48 hereinbefore described in connection with FIG. 2. The active rectifier 58 may be a standard six-switch IGBT (MOSFET or other switching device) rectifier employing IGBTs, MOSFETs or other switching devices, a multi-level rectifier, or a phase controlled SCR based rectifier. In this embodiment, the power turbine controller 28 produces gate drive signals for the active rectifier system 58 on a gate drive signal line 60 that changes in response to speed variations of the power turbine shaft 18. These variations may result from any change in input torque supplied by the gas generator compressor spool 6 or load torque exerted by the generator 20 due to increased power draw on the AC bus 22.

For instance, if the power turbine controller 26 senses a drop in rotary speed of the power turbine spool 8 under a predetermined operating speed, the power turbine controller 26 varies the gate drive signal pulses that the active rectifier system 58 receives on the gate drive signal line 60 so that it reduces its output and therefore the load that it exerts on the generator 20 and in turn the torque that the generator 20 exerts on the power turbine spool 8, thereby letting the rotary speed of the power turbine spool 8 return to its predetermined operating speed. If the power turbine controller 26 senses an increase in rotary speed of the power turbine spool 8 over the predetermined operating speed, the power turbine controller 26 varies the gate drive signal pulses that the active rectifier system 58 receives on the gate drive signal line 60 so that it reduces its output and therefore the load that it exerts on the generator 20 and in turn the torque that the generator 20 exerts on the power turbine spool 8, thereby letting the rotary speed of the power turbine spool 8 return to its predetermined operating speed.

Of course, where a combination of AC and DC loads are present, a power turbine speed control system according to the invention may comprise any suitable combination of the first, second and third embodiments of the invention hereinbefore described in connection with FIGS. 1, 2 and 3. In other words, a power turbine control system according to the invention may have a combination of AC loads 24 supplied by AC bus 22 and DC loads 50 supplied by DC bus 54, either the active rectifier system 58, the passive rectifier system 52 or their combination, and the power turbine controller 28 may generate an excitation signal for the generator 20, a gate drive signal for the active rectifier system 48 and or their combination, as shall be appreciated by those skilled in the art.

Figure 4:
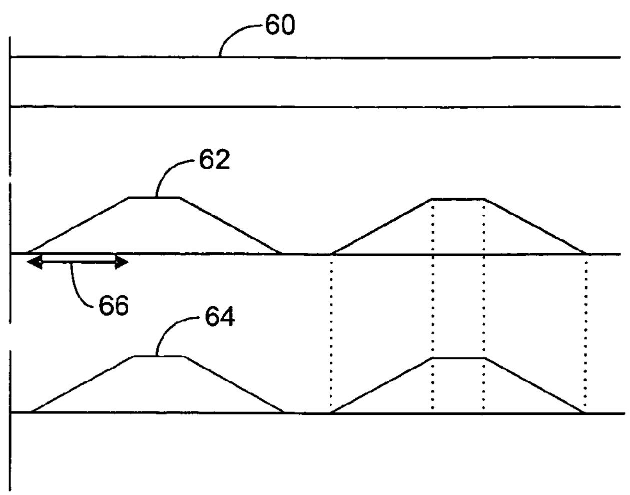
FIG. 4 is a diagram of compressor spool speed/power turbine spool torque and controlled generator power output as a function of time.

FIG. 4 is a diagram of compressor spool speed/power turbine spool torque and controlled generator power output as a function of time for the three possible embodiments of the invention hereinbefore described in connection with FIGS. 1 through 3. Line 60 represents rotary speed of the power turbine spool 8 as a function of time. Line 62 represents rotary speed of the gas generator compressor spool 6 as a function of time, and therefore torque input to the power turbine spool 8 as a function of time. Line 64 represents power output of the generator 20 as a function of time, and therefore torque exerted on the power turbine spool 8 as a function of time. Line 66 represents the transient response time of the gas generator compressor spool 6 as a function of time, typically in the range of approximately 2 to 3 seconds. The rotary speed of the power turbine spool 8 remains constant regardless of the transient response time of the gas generator compressor spool 6 because the power turbine controller 26 forces the output of the generator 20, and thus the torque that it exerts on the power turbine spool 8, to track the available torque from the generator compressor spool 6, even during its transient periods.

Figure 5:
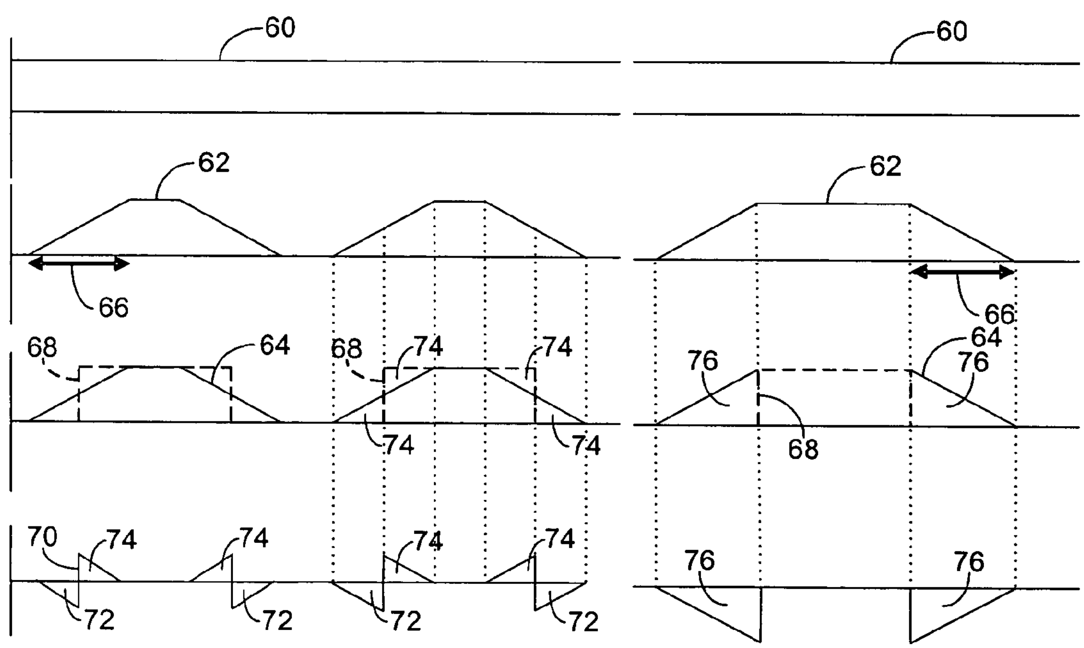
FIG. 5 shows a diagram of compressor spool speed/power turbine spool torque and controlled generator power output as a function of time improved with both storage and parasitic load approaches to control of an energy management system.

It is possible to improve the transient performance of the three possible embodiments of the invention hereinbefore described in connection with FIGS. 1 through 3 further by suitable control of the energy management system 38. FIG. 5 shows both storage, such as battery, flywheel, capacitor bank, and so forth, and parasitic load approaches to such control of the energy management system 38. Line 68 represents the desired transient response of the three possible embodiments of the invention.

For the storage approach, line 70 represents energy that the energy management system 38 adds to or subtracts from the load current on its respective bus as a function of time. Regions 72 represent the energy management system 38 acting as an energy sink and regions 74 represent the energy management system 38 acting as an energy source. Line 68 then represents the combined response of line 64 representing power output of the generator 20 and line 70 representing energy that the energy management system 38 adds to or subtracts from the rapid transitioning load power on its respective bus as a function of time, resulting in an almost transition free change in generated electrical power.

For the parasitic load approach, line 76 represents the amount of energy that the energy management system 38 dissipates as a function of time. Line 68 then represents the combined response of line 64 representing the rapid transient load and line 76 representing the amount of energy that the energy management system 38 dissipates as a function of time similarly results in an almost transition free change in generated electrical power.

The described embodiments of the invention are only some illustrative implementations of the invention wherein changes and substitutions of the various parts and arrangement thereof are within the scope of the invention as set forth in the attached claims.

The claimed invention is:

1. A power turbine speed control system for a turbo-shaft type gas turbine engine that has a gas generator compressor spool and a power turbine spool and drives an electrical generator that powers at least one electrical load by way of at least one electrical bus, comprising:

at least one AC bus powered by the electrical generator;

at least one direct current (DC) bus;

at least one DC load powered by the DC bus;

at least one AC to DC rectifier system that converts power on the AC bus to DC power for the DC bus;

a power turbine controller that senses the rotary speed of the power turbine spool and generates at least one signal that changes the torque of the electrical generator in response to the sensed change in the rotary speed of the power turbine spool;

an energy management system for adjusting the electrical load on the electrical generator; and a fuel system controller for generating a fuel command signal that changes fuel delivered to the gas generator compressor spool in response to a feed forward signal representative of predicted electrical transients in the electrical load.

2. The power turbine speed control system of claim 1, wherein the rectifier system is of the passive type and the power turbine controller generates a generator excitation signal that changes the torque of the electrical generator.

3. The power turbine speed control system of claim 1, wherein the rectifier system is of the active type and the power turbine controller generates gate drive signals that change the load of the rectifier system on the electrical generator.

4. The power turbine speed control system of claim 1, wherein the energy management system comprises an energy storage system.

5. The power turbine speed control system of claim 1, further comprising an energy sink system.

* * * * *